United States Patent [19]

Urso

[11] Patent Number: 4,982,912
[45] Date of Patent: Jan. 8, 1991

[54] LINE CONTROL DEVICE FOR AXIAL DELIVERY REELS

[76] Inventor: Charles L. Urso, 215 Newton St., Waltham, Mass. 02154

[21] Appl. No.: 300,956

[22] Filed: Jan. 23, 1989

[51] Int. Cl.$^5$ .................... A01K 89/01; A01K 89/015
[52] U.S. Cl. ................................... 242/231; 242/228; 242/311
[58] Field of Search ............... 242/230, 231, 233, 234, 242/235, 236, 237, 323

[56] References Cited

U.S. PATENT DOCUMENTS

| | | | |
|---|---|---|---|
| 399,588 | 3/1889 | Washburn | 242/323 X |
| 2,658,697 | 11/1953 | Steinbaugh | 242/233 |
| 2,776,803 | 1/1957 | Shakespheare . | |
| 3,255,982 | 6/1966 | Emry | 242/230 X |
| 3,603,018 | 9/1971 | Mercer | 242/323 X |

Primary Examiner—Katherine Matecki
Attorney, Agent, or Firm—Hamilton, Brook, Smith & Reynolds

[57] ABSTRACT

A line control device for axial delivery casting reels of the type that include a spool and a line pick-up (44) having a bail and a line guide or roller (42). The device comprises a mechanical finger (16) pivotally supported and having a pivotal axis approximately parallel with the reel spool axis. The finger is positioned to move in front of the line guide. Thus, the finger catches and holds casting line (50) extending from the guide as the finger moves to a line engaged position. Included are means operated by the thumb of the user for moving the finger to the line engaged position. A spring (40) urges the finger toward a line disengaged position so that the line can be instantly released for a cast. The device can also serve with open face driven spool reels (52) in a dual role; as a line pickup for winding and as a line release finger for casting.

17 Claims, 2 Drawing Sheets

LINE CONTROL DEVICE FOR AXIAL DELIVERY REELS

TECHNICAL FIELD

This invention relates to axial delivery reels having means for line pay-off along a direction parallel to the spool axis and more particularly to line engaging and line releasing devices.

BACKGROUND

Axial delivery reels are those in which the spool is supported such that line wound upon the spool can pay-off longitudinally of the spool axis during a line cast. A major advantage is that they do not cause backlash. A common group of such reels are the spincast type having shroud covered spools. The casting line passes through an aperture in the shroud to guide the line. A line engaging and line releasing device rotates about the spool during winding. Spincast reels are convenient to operate, but friction caused by the shroud results in relatively short casts.

A group of axial delivery reels that produce longer casts than the spincast type are spinning reels having an open face. They include an open spool partly surrounded by a line pick-up. The pick-up usually comprises a wire bail which leads the cast line onto a guide or roller. During winding the pick-up is driven by a crank to rotate about the normally nonrotating spool.

Though spinning reels produce longer casts, they are not as convenient to operate as the spincast group. To prepare for a cast, the user must reach down with the index finger of the hand that holds the rod and reel to lift the casting line above the roller. He then holds the line on his finger while opening the bail. During the cast swing, he must straighten his finger to let go of the line at the right instant. Since this is an awkward and fairly difficult maneuver to perform with precise timing, the casts tend to be erratic in distance and accuracy.

In the embodiments of the subject invention, a mechanical finger performs the functions of the user's index finger, but with greater speed and precision. One embodiment improves a conventional spinning reel. Another embodiment improves an axial delivery reel in which the crank drives the spool rather than the line pick-up. The latter method of winding has an important advantage when relatively strong or heavy lines are reeled. The advantage relates to the issue of line twist which is explained in the following paragraphs.

As mentioned, when line is cast from any axial delivery reel, the line peels off of the spool longitudinally of the spool axis. With a nonrotating spool, a full twist occurs in the outstretched line for each turn that unravels from the spool. Conventional spinning reels and spincast reels correct the twist problem by rotating the line pick-up during line retrieval in order to reverse the twist. This works well for relatively thin monofilament.

When using heavy service lines, however, such as braided lines or monofilament having a test strength of 40 lbs. or greater, the outstretched line automatically untwists when being retrieved (assuming a swivel is attached). This occurs before the line reaches the line pick-up of the reel. Consequently, a rotating or spinning line pick-up of a conventional reel twists the straightened line as the latter is wound. This results in the spool being loaded with twisted line.

In an axial delivery driven spool reel wherein the crank drives the spool (not the pick-up) during winding, twist is prevented when the heavy service lines are reeled. This winding method can be used to advantage. Limper monofilament lines have been developed and are now being marketed in 40 lb. test strength and over. Hence, the new lines can pave the way to a successful future for open face driven spool reels. They could be used for fishing or for other applications including rescue operations.

The subject invention can be applied to great advantage in improving conventional spinning reels, especially for using lines of under 40 lb. test. The invention can also improve open face driven spool reels, especially for using lines of 40 lb. test or greater.

OBJECTS AND ADVANTAGES

An object of the invention is to provide a mechanical finger in open face reels for catching and holding the casting line in preparation for a cast. The mechanical finger being faster and more convenient than the user's index finger in accomplishing the task.

Another object is to provide a device for instant release of the line during a cast swing for improved user control of the cast thereby resulting in longer casts and more accurate placement of the cast object.

Another object is to provide a device that eliminates the need for the user to handle the line with his fingers during operation of open face reels including conventional spinning reels.

Another object is to provide a device that eliminates the need for a bail in open face driven spool reels, while providing all of the above advantages.

Another object is to provide the above mentioned device comprised of very few parts, most of which can be molded in plastic to add very little weight or cost to the improved reels.

Other objects and advantages of the invention will become apparent from consideration of the drawings and ensuing description.

BRIEF DESCRIPTION OF THE DRAWINGS

The accompanying drawings in combination with the description herewith, illustrate features and advantages of the invention. Like reference characters in different views refer to the same parts. The drawings are intended to illustrate principles of the invention and are not necessarily to scale and in which drawings.

DETAILED DESCRIPTION

Figure 1:
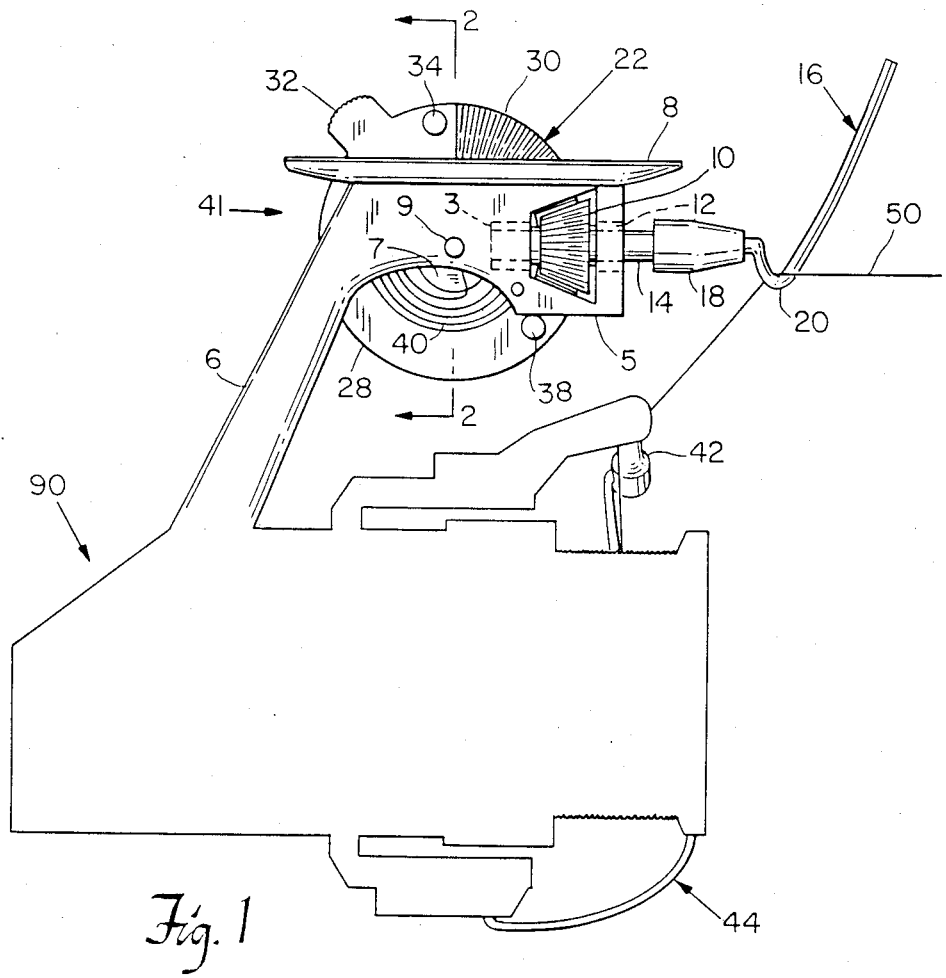
FIG. 1 is a side elevation view of a device in accordance with the invention combined with a conventional spinning reel shown in outline.

A line control device embodying the principles of this invention is identified generally by the numeral 41 in FIG. 1. The device 41 is combined with a conventional spinning reel 90 indicated in outline. Included in the device is a plastic support frame 5 which is molded in combination with the reel neck 6 and saddle 8. The saddle is used to mount the reel to a casting rod. Alternatively, the frame 5 can be a separate unit which can be detachably connected to the neck and saddle of a conventional spinning reel.

The support frame 5 defines a trapezoid shaped opening for receiving a bevel gear 10. A bore in the frame 5 passes through the parallel sides defining the trapezoidal opening and receives a front bushing 12 and a rear bushing 3. Bushings 12, 3 are coaxially aligned on opposite sides of the trapezoidal opening to receive a shaft 14. The shaft passes through gear 10 which is coaxially fixed to the shaft by a set screw or other suitable means. When the gear is driven, the shaft rotates within bushings 12, 3.

Figure 2:
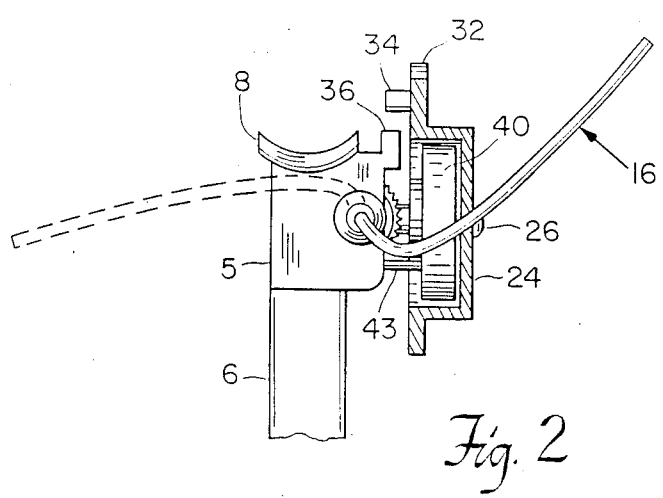
FIG. 2 is a front view of the device of FIG. 1 including a cross-sectional portion taken along line 2—2, wherein the conventional portion of the spinning reel is broken away.

Fixedly attached to a front end portion of shaft 14 is a mechanical finger 16. A conventional connector 18 provides the means of attachment. The finger is curved as shown in FIG. 1 and 2 wherein the sharpest portion of the curve forms a line holding portion 20. Due to its attachment to shaft 14, the finger can pivot between a line engaged position (solid representation in the figures) and a line disengaged position (phantom representation in FIG. 2). The pivotal axis is approximately parallel to the rotational axis of the spool of reel 90. Thus, the axes are directed in a forward direction; the general direction of a cast. The finger is positioned to move transversely through an imaginary line extending from the pick-up roller or guide 42 in a direction parallel to the spool axis. Thus, the finger will hook or catch casting line 50 extending from the guide when the finger moves to the line engaged position. In the process, the line is lifted above guide 42 wherein the line slides into the line holding portion 20 of the finger.

Pivotal movement of finger 16 is produced by way of a thumb wheel 22. The wheel comprises an annular hat-shaped housing having a hub 7 (FIG. 1) coaxially fixed to a center wall 24 (FIG. 2). Hence, the hub is housed within the hollow of the wheel. A central bore in hub 7 receives a wheel shaft 9 which is press fitted into a bore in frame 5. A screw 26, passing through an aperture in wall 24, is received in a threaded bore in an outer end portion (not shown) of shaft 9. Thus, the screw 26 holds the wheel 22 for pivotal movement on shaft 9. A portion of wheel 22 is formed into a beveled sector gear 30 which is drivingly engaged with gear 10. The gear ratio is such that about fifty degrees of rotation of wheel 22 pivots finger 16 from the line disengaged position to the line engaged position.

Extending from the rim 28 of the wheel is a tab-like thumb grip 32 having knurled edges. Also extending from rim 28 is a first stop post 34 which limits forward motion of wheel 22 by contacting an upper edge 36 (FIG. 2) of frame 5. When the forward limit is reached, the finger 16 is in the line disengaged position. A second stop post 38, extending from rim 28, limits the rearward motion of wheel 22 by contacting the underside of frame 5 (as shown in FIG. 1). When the rearward limit is reached, finger 16 is in the line engaged position.

A peripheral portion of wheel hub 7 includes a radial slot which receives an inner end portion of a clock spring 40 which encircles the hub. An outer end portion of the clock spring is attached (under tension) to a pin 43 (FIG. 2) extending into the hollow of the wheel from an aperture in frame 5. The combination is arranged such that the spring urges the wheel forward in a clockwise direction. Thus, the finger 16 is urged toward the line disengaged position.

From the above description it can be understood that when the grip is moved, a point on the outer end of the finger moves in a first plane and a point on the grip moves in a second plane wherein the two planes are approximately perpendicular to each other. The second plane being approximately parallel with the finger pivotal axis.

When the reel 90 including device 41 is attached to a rod, a user can hold the rod and reel in a normal casting grip wherein his thumb will comfortably rest on the thumb grip. The usual cast preparation of a conventional spinning reel includes moving the pick-up guide 42 of the line pick-up 44 to an upper position. But, instead of reaching down as usual with his index finger to pick up the line, the user can draw the thumb grip 32 rearward with his thumb. Thus, finger 16 will catch, lift, and hold the casting line 50. This eliminates handling the line with the index finger and is much easier and faster. He can then open the bail in a normal manner.

During the cast swing, the user simply lifts his thumb off of the thumb grip. That causes finger 16 to instantly snap back to the line disengaged position, wherein the line is released. This is more efficient than the less precise conventional method.

Adapting the Invention to an Open Face Driven Spool Reel

Figure 3:
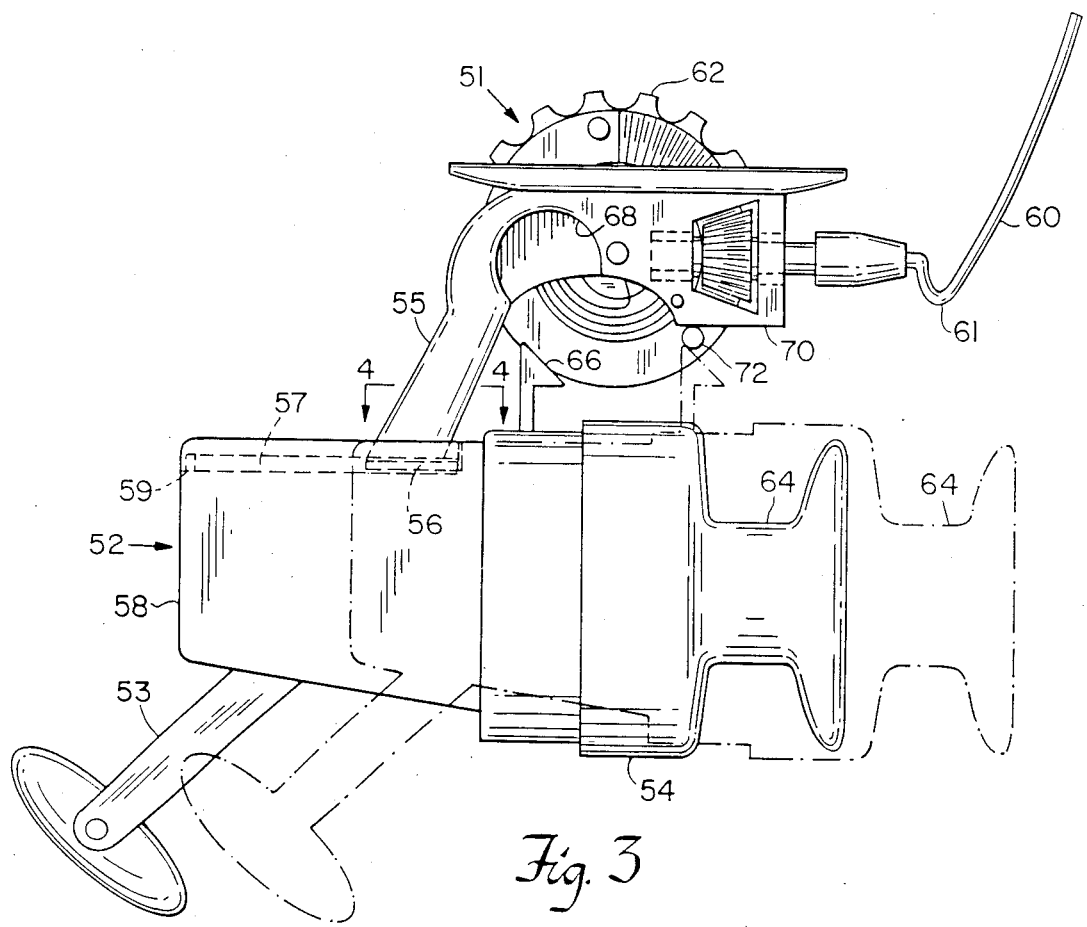
FIG. 3 is a side elevation view of a device in accordance with the invention incorporated in an axial delivery driven spool reel.

Shown in FIG. 3 is a line control device 51 adapted to an open face reel 52. A hand crank 53 is drivingly connected to the spool 54. Unlike a spinning reel, rotation of the crank drives the spool to rotate rather than a line pick-up. The internal components for driving the spool are not shown since driven spool reels are known in the art.

Figure 4:
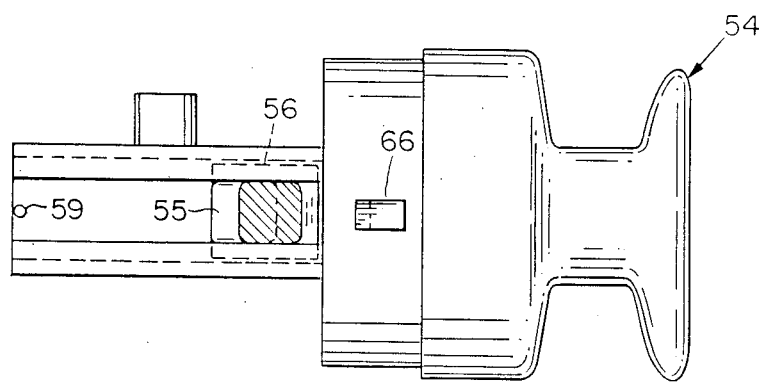
FIG. 4 is a top view of the reel of FIG. 3 without the hand crank and sectioned along the line 4—4.

As shown in FIGS. 3 and 4, the lower end of the neck 55 terminates as a rectangular flange 56 which is fixed to the neck. The flange 56 is received in a linear bearing or track 57 which is molded as an upper portion of the gearbox 58. A pin 59 press fitted in a small aperture in the gearbox prevents the flange from sliding out of the end of the track. When mounted to a rod, the reel 52 below the neck 55 is slidable in the direction of the spool axis. The reel can be axially moved relative to the finger 60 between a casting position (solid representation in FIG. 3) and a winding position (indicated by the phantom image in FIG. 3). Further, the reel can be releasably locked in either of its two limiting positions by any suitable spring loaded catch or latch (not shown).

The line control device 51 is similar to device 41 of FIGS. 1 and 2 except that an alternative thumb grip 62 and a longer finger 60 are provided. The grip 62 comprises a series of spaced projections rather than the single tab grip of device 41.

Also included is a finger rest or grip 68 formed as a cavity defined by the combination of neck 55 and frame 70.

Fixed to an upper portion of reel 52 is a triangular cam 66 which engages stop post 72 when the reel moves to the winding position. Post 72 serves the same function as post 38 in device 41, but in this case it provides an added function as a cam follower.

In this embodiment, the line control device 51 serves a dual role; as a line pick-up for winding and as a line release finger for casting. The device 51 is operated in much the same manner as device 41 for reel 90, but with the following differences:

When casting, the reel 52 must be in the casting position. That allows finger 60 to swing past the front of the spool when released (thereby releasing the casting line).

After a cast, the user can move reel 52 to the winding position wherein cam 66 moves the thumb wheel counterclockwise. Thus, the line is picked up by the finger as the latter automatically moves to the line engaged position. The user can then wind the line. In the winding position, the spool core 64 and the line holding portion 61 of the finger are along an imaginary line which is perpendicular to the spool axis. Reel 52 may include a spool oscillator as is conventional with open face reels for level winding the line. A roller (not shown) may be added to encircle the line holding portion 61 of the finger 60 to reduce friction during winding.

As can be understood from the BACKGROUND information, the spinning reel embodiment of FIGS. 1 and 2 is particularly advantageous when using monofilament of under 40 lb. test. The driven spool reel embodiment of FIGS. 3 and 4 is particularly advantageous when using monofilament or braided lines of 40 lb. test and over.

While the above description contains many specificities, these should not be construed as limitations on the scope of the invention, but rather as exemplifications of preferred embodiments thereof. Those skilled in the art will envision other possible variations that are within its scope. Accordingly, the scope of the invention should be determined not by the embodiments illustrated, but by the appended claims and their legal equivalents.

What is claimed is:

1. A line control device for axial delivery reels of the type which includes a spool having a first axis normally directed in a line casting direction and a line pick-up supported to pivot about a second axis wherein the pick-up includes a line guide, the device comprising:
    a mechanical finger supported to pivot about a third axis wherein the second and third axes are movable relative to each other, the finger being movable between a line engaged position and a line disengaged position, the finger being positioned to move across line extending forwardly from the guide thereby causing the finger to catch the line then the finger moves to the line engaged position;
    means for moving the finger to the line engaged position including a movable grip operable by a user's digit such that the grip moves in a plane which is approximately parallel to the third axis; and
    a spring connected to the finger and the spring mounted for urging the finger to move about the third axis to the line disengaged position thereby releasing the line for a cast.

2. The line control device as defined in claim 1, wherein the means for moving the finger to the line engaged position comprises:
    a driven gear supported to pivot about the third axis, the gear being connected to the finger; and
    a drive gear supported to pivot about a fourth axle and drivingly connected to the driven gear wherein the third and fourth axes are transverse relative to each other, the drive gear being connected to the grip.

3. The line control device as defined in claim 1, wherein the finger is curved so as to from a line holding portion for containing the line when in the line engaged position.

4. A line control device for axial delivery reels of the type which includes a spool having a first axis normally directed in a casting direction and a line pick-up supported to pivot about a second axis wherein the pick-up includes a line guide, the device comprising:
    a mechanical finger having an outer end, the finger being supported to pivot about a third axis wherein the second and third axes are movable relative to each other, the finger being movable about the third axis between a line engaged position and a line disengaged position, the finger being positioned to move across line extending forwardly from the guide thereby causing the finger to catch the line when the finger moves to the line engaged position;
    a driven gear supported to move about the third axis and the gear being connected to the finger;
    a drive gear supported to move about a fourth axis wherein the gear axes are transverse relative to each other, the drive gear being drivingly connected to the driven gear; and
    a grip connected to the drive gear for moving the gears by a human digit such that the outer end of the finger moves in a first plane and the grip moves in a second plane wherein the two planes are approximately perpendicular to each other.

5. The line control device as defined in claim 4, further comprising a spring connected to the finger and the spring mounted for urging the finger to move about the third axis to the line disengaged position wherein the third axis is forwardly directed.

6. The line control device as defined in claim 4, wherein the grip is normally positioned above the gear axes for contact and operation by a thumb of a user's hand which holds a casting rod on which the device is mounted.

7. The line control device as defined in claim 4, further comprising the drive gear being formed as at least a portion of a hollow housing which houses a spring therein, the spring being connected to the drive gear for urging the drive gear to move the finger about the third axis to the line disengaged position thereby releasing the line for a cast.

8. An axial delivery reel comprising:
    a housing;
    a spool having a first axis normally directed in a line casting direction, the spool being supported on the housing: a line pick-up supported to pivot about a second axis and supported to rotate about the first axis, the pick-up having a line guide;
    means for driving the pick-up to rotate in order to wind line on the spool;
    a mechanical finger supported to pivot about a forwardly directed third axis wherein the second and third axes are movable relative to each other, the finger being movable between a line engaged position and a line disengaged position, the finger being positioned to move across line extending forwardly from the guide thereby causing the finger to catch the line when the finger moves to the line engaged position;
    means for moving the finger to the line engaged position; and
    a spring connected to the finger and the spring mounted for urging the finger to move about the third axis to the line disengaged position thereby releasing the line for a cast.

9. The reel as defined in claim 8, wherein the means for moving the finger to the line engaged position comprises:
    a driven gear supported to move about the third axis, the gear being connected to the finger;

a drive gear supported to move about fourth axis which is transverse relative to the third axis, the drive gear being drivingly connected to the driven gear; and means for moving the drive gear by way of a user's digit.

10. An open face axial delivery reel comprising:

a housing;

a spool supported on the housing, the spool having a spool axis normally directed in a line casting direction;

means for winding line on the spool;

a mechanical finger supported to pivot about a forwardly directed finger axis which is stationary relative to the spool axis, the finger being movable between a line engaged position and a line disengaged position, the finger being positioned to catch line connected to the spool when the finger moves to the line engaged position;

means for moving the finger to the line engaged position; and a string connected to the finger for urging the finger to move about the finger axis to the line disengaged position thereby releasing the line for a cast.

11. The reel as defined in claim 10, wherein the means for moving the finger to the line engaged position comprises:

a driven gear supported to move about the finger axis and the gear being connected to the finger;

a drive gear supported to move about a drive gear axis which is transverse relative to the finger axis, the drive gear being drivingly connected to the driven gear; and means for moving the drive gear by way of a user's digit.

12. The line control device as defined in claim 10, wherein the finger is curved so as to form the line holding portion for containing the line when in the line engaged position.

13. An axial delivery reel comprising;

a housing;

a spool supported on the housing, the spool having a first axis normally directed in a line casting direction;

a line pick-up supported to pivot about a second axis, the pick-up having a line guide;

means, cooperative with the pick-up, for winding line on the spool;

a mechanical finger supported to pivot about a third axis which is stationary relative to the first axis, the finger being movable between a line engaged position and a line disengaged position, the finger being positioned to move across line extending forwardly from the guide thereby causing the finger to catch the line when the finger moves to the line engaged position;

means for moving the finger to the line engaged position by including movable grip operable by a user such that the grip moves in a plane which is approximately parallel to the third axis; and a spring connected to the finger for urging the finger to move about the third axis to the line disengaged position thereby releasing the line for a cast.

14. An axial delivery reel comprising:

a housing;

a spool supported on the housing, the spool having a spool axis;

means for winding line on the spool;

a mechanical finger having an outer end, the finger being supported to pivot about a finger axis which is stationary and aproximately parallel relative to the spool axis, the finger being movable between a line engaged position and a line disengaged position, the finger being positioned to catch line connected to the spool when the finger moves to the line engaged position;

a driven gear supported to move about a driven gear axis and the gear being connected to the finger;

a drive gear supported to move about a drive gear axis which is transverse relative to the driven gear axis, the drive gear being drivingly connected to the driven gear; and a grip connected to the drive gear for moving the gears by a user's digit such that the outer end of the finger moves in a first plane and the grip moves in a second plane wherein the two planes are approximately perpendicular to each other.

15. The reel as defined in claim 14, further comprising a spring connected to the finger and the spring mounted for urging the finger to move about the finger axis to the line disengaged position thereby releasing the line for a cast.

16. The reel as defined in claim 14, wherein the grip is normally positioned above the gear axes for contact and operation by a thumb of a user's hand which holds a casting rod on which the device is mounted.

17. The reel as defined in claim 14, further comprising the drive gear being formed as at least a portion of a hollow housing which houses a spring therein, the spring being connected to the drive gear for urging the drive gear to move the finger about the finger axis to the line disengaged position thereby releasing the line for a cast.

* * * * *

UNITED STATES PATENT AND TRADEMARK OFFICE
CERTIFICATE OF CORRECTION

PATENT NO. : 4,982,912

DATED : January 8, 1991

INVENTOR(S) : Charles L. Urso

It is certified that error appears in the above-identified patent and that said Letters Patent is hereby corrected as shown below:

Column 5:

At claim 1, line 40, change "then" to --when--.

At claim 2, line 55 change "axle" to --axis--.

At claim 3, line 61, change "from" to --form--.

Column 6:

At claim 8, lines, 45-46 change ":" to --;-- and make "a line pick-up ........ guide;" a separate element in the claim.

Column 7:

At claim 9, line 1, after "about" insert the word --a--.

At claim 10, line 22, change "string" to --spring--.

Column 8:

At claim 13, line 6, delete the first "by" and after "including" insert the word --a--.

UNITED STATES PATENT AND TRADEMARK OFFICE
CERTIFICATE OF CORRECTION

PATENT NO. : 4,982,912
DATED : January 8, 1991
INVENTOR(S) : Charles L. Urso

It is certified that error appears in the above-identified patent and that said Letters Patent is hereby corrected as shown below:

Column 8, claim 14, line 19, change "aproximately" to
--approximately--.

Signed and Sealed this

Twenty-first Day of July, 1992

Attest:

DOUGLAS B. COMER

Attesting Officer

Acting Commissioner of Patents and Trademarks